Sept. 9, 1941.　　　L. E. WHITON　　　2,255,202
LATHE CHUCK
Filed Dec. 29, 1937
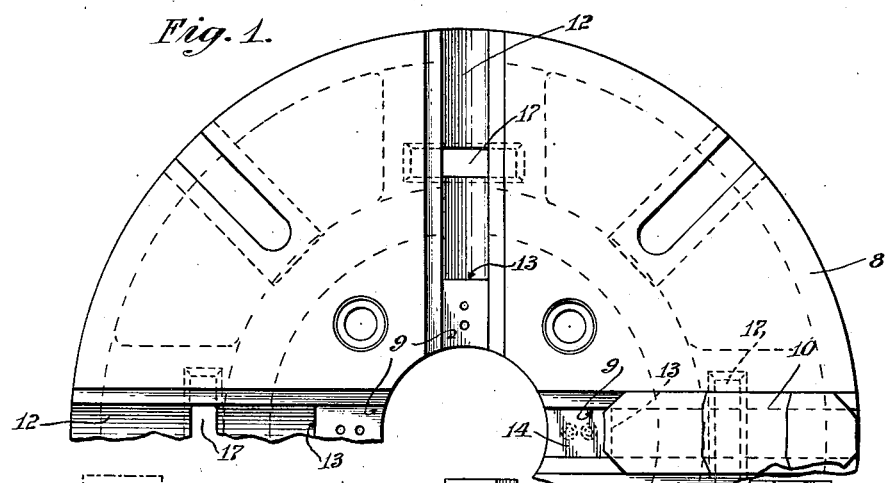
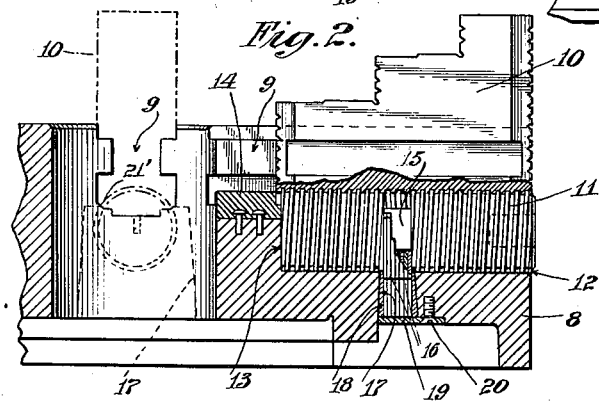
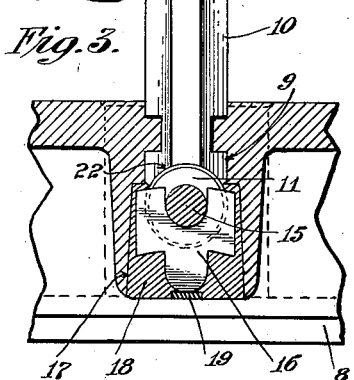
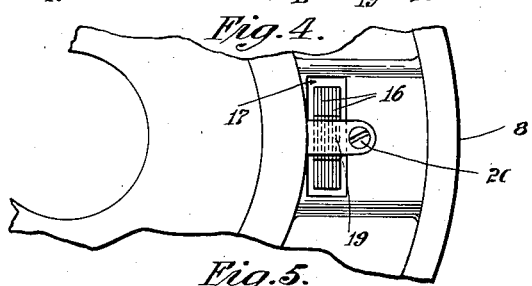
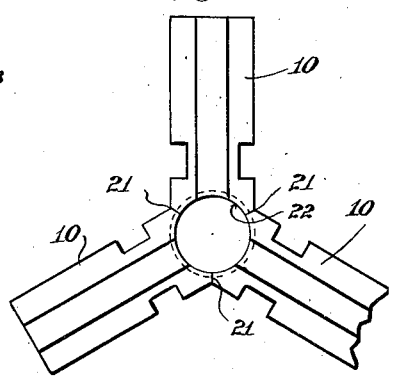
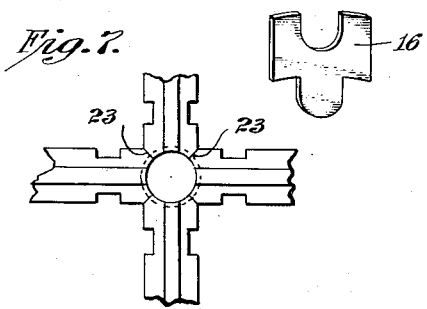
INVENTOR
Lucius E. Whiton
BY
ATTORNEY Patented Sept. 9, 1941

2,255,202

UNITED STATES PATENT OFFICE 2,255,202

LATHE CHUCK

Lucius E. Whiton, New London, Conn.

Application December 29, 1937, Serial No. 182,197

2 Claims. (Cl. 279—112)

My invention relates particularly to independent jawed chucks and constitutes improvements in the type of construction shown in my Patents Nos. 369,758 and 422,479.

Such constructions have been widely used and in fact have become almost universal in chucks of this character.

One object of the present invention is to provide a construction which can be made more cheaply and which will have longer life. I have especially sought to provide a structure which requires a minimum of machine work.

I accordingly provide a new way of holding the jaw adjusting screw which involves the formation of the recess for the screw abutment in the casting operation and then inserting a number of relatively thin plates and filling in the remainder of the recess with die cast metal or other metal of high resistance to compression.

The jaws are formed with their inner edges making a predetermined angle of 90° or 120° to each other so that they can be clamped together and screw threads cut in all of them at one time.

Figure 1 is a face view of one half of a chuck embodying my invention.

Figure 2 is a fragmentary axial section showing the invention.

Figure 3 is a transverse section showing the abutment.

Figure 4 is a fragmentary back view showing the means for holding the abutment in place.

Figure 5 is a perspective view of one of the abutment plates.

Figure 6 is an end view showing the arrangement for threading three jaws simultaneously.

Figure 7 shows the arrangement for threading four jaws at once.

The chuck body 8 has guide ways 9 for the usual jaws 10. Adjusting screws 11 are mounted in grooves 12 which may terminate at 13. Fillers 14 may be provided. The central portion of the screw 11 is reduced at 15 as usual. In place of the former solid abutment I now provide a plurality of thin plates 16 which may be conveniently stamped from sheet metal such as steel and shaped to embrace the central portion 15 of the screw and hardened. In place of the usual machined recess I provide a recess 17 which may be formed in the mold when casting the chuck body. This recess is preferably tapered or wedge-shaped and open at the top and bottom. The plates 16 are assembled and inserted in the recess from the bottom. A metallic filling 18 is then poured into the recess 17 around the plates 16 so as to hold the plates in place. An additional safeguard in the shape of a plate 19 and screw 20 may also be provided to prevent accidental displacement or dislodgment of the plates 16 and filler 18. When the plate 19 is removed the plates 16 and filler 18 may be readily driven out by pressure applied to the edges of the plates or the filler alongside of the central portion 15 of the screw through the channel or guideway 12.

In case one plate becomes worn the plates can be reversed and the worn plate turned over or replaced at slight expense thus affording fresh bearing surfaces and prolonging the life of the chuck.

The inner edges of each jaw are bevelled at 21 at angles of 120° relative to each other so that when three of them are secured together as shown in Fig. 6 the space between can be bored out and tapped to accommodate the threads of the adjusting screw. This method of forming the screw threads 22 in the backs of the jaws results in an inmortant reduction in the cost of production. The guide way 9 is shaped to correspond with the cross sectional shape of the jaws and hence has bevelled shoulders 21' to fit the bevelled edges of the jaws.

In Fig. 7 I have shown four jaws in position to have the threads cut in them simultaneously. In this case the edges 23 are at 90° to each other. This form is adapted especially to smaller jaws.

The guide ways will of course be shaped to correspond with the edges of the jaws.

I claim:

1. A lathe chuck body having recesses with radial jaw-adjusting screws and a tapered recess intersecting each screw recess, a set of thrust plates in each tapered recess engaging the respective screws and a cast metal filler anchoring each set of thrust plates in its recess, the thrust on said plates being normal to their thickness and the plates being capable of rearrangement to take up wear on an end plate.

2. A lathe chuck body having a jaw and a jaw-adjusting screw located in superposed grooves and an enlarged recess extending through the body and intersecting the said grooves, a thrust member in said recess and engaging said screw and a filler cast in said recess around said member and under compression in use and accessible through said recess for driving out said member and filler.

LUCIUS E. WHITON.